May 15, 1962 C. P. LENT 3,034,747
AIRCRAFT WITH DISCOID SUSTAINING AIRFOIL
Filed Jan. 8, 1957 5 Sheets-Sheet 1
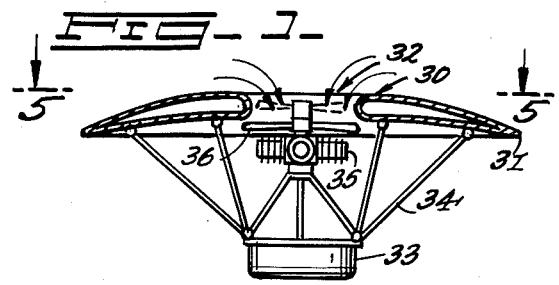
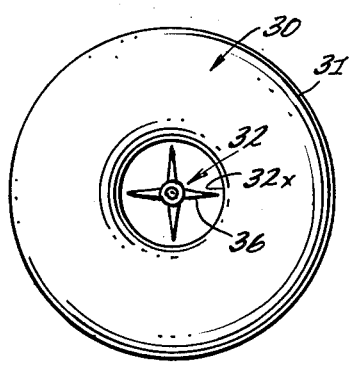
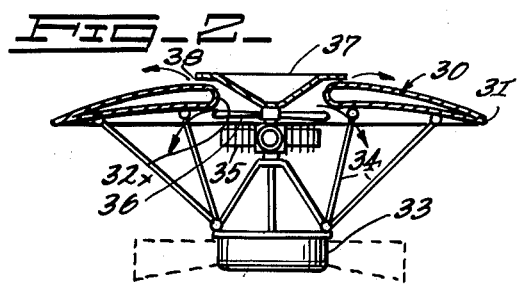
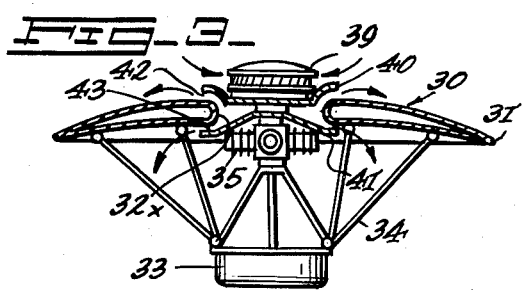
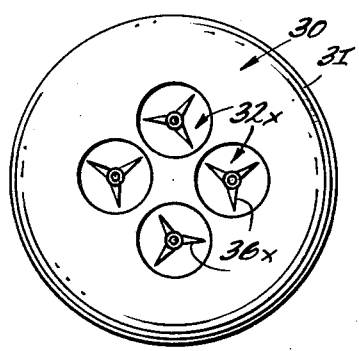
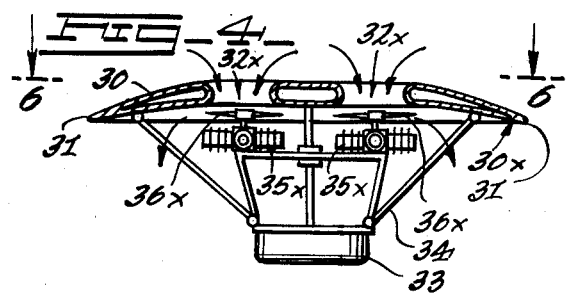
INVENTOR.
Constantin P. Lent May 15, 1962  C. P. LENT  3,034,747
AIRCRAFT WITH DISCOID SUSTAINING AIRFOIL
Filed Jan. 8, 1957  5 Sheets-Sheet 2
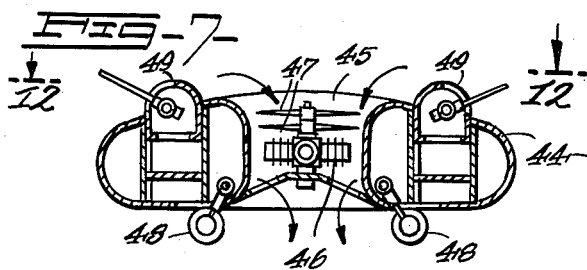
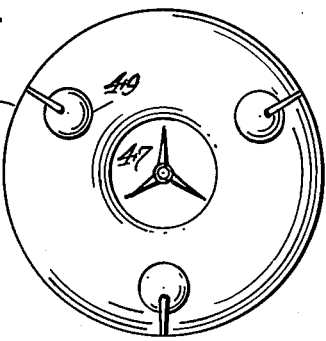
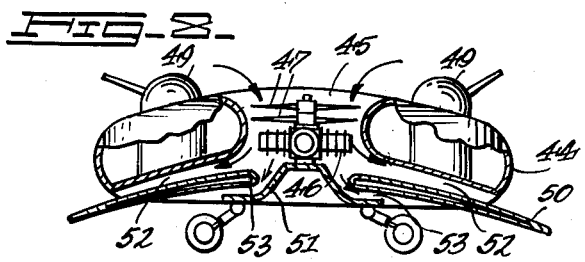
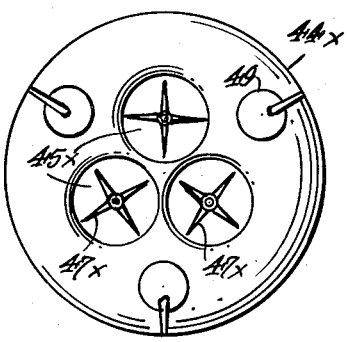
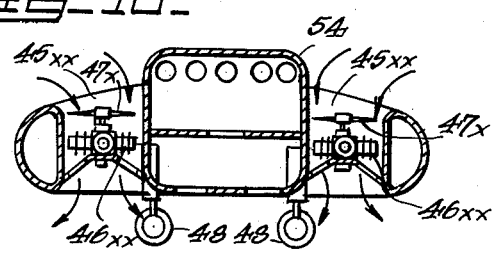
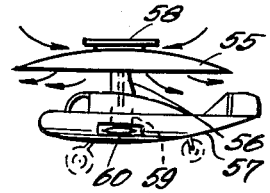
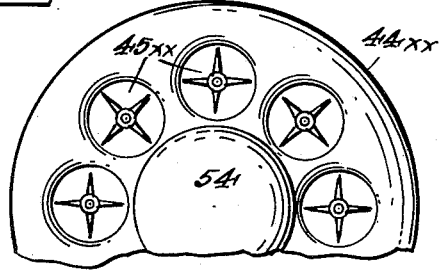
INVENTOR.
Constantin P Lent

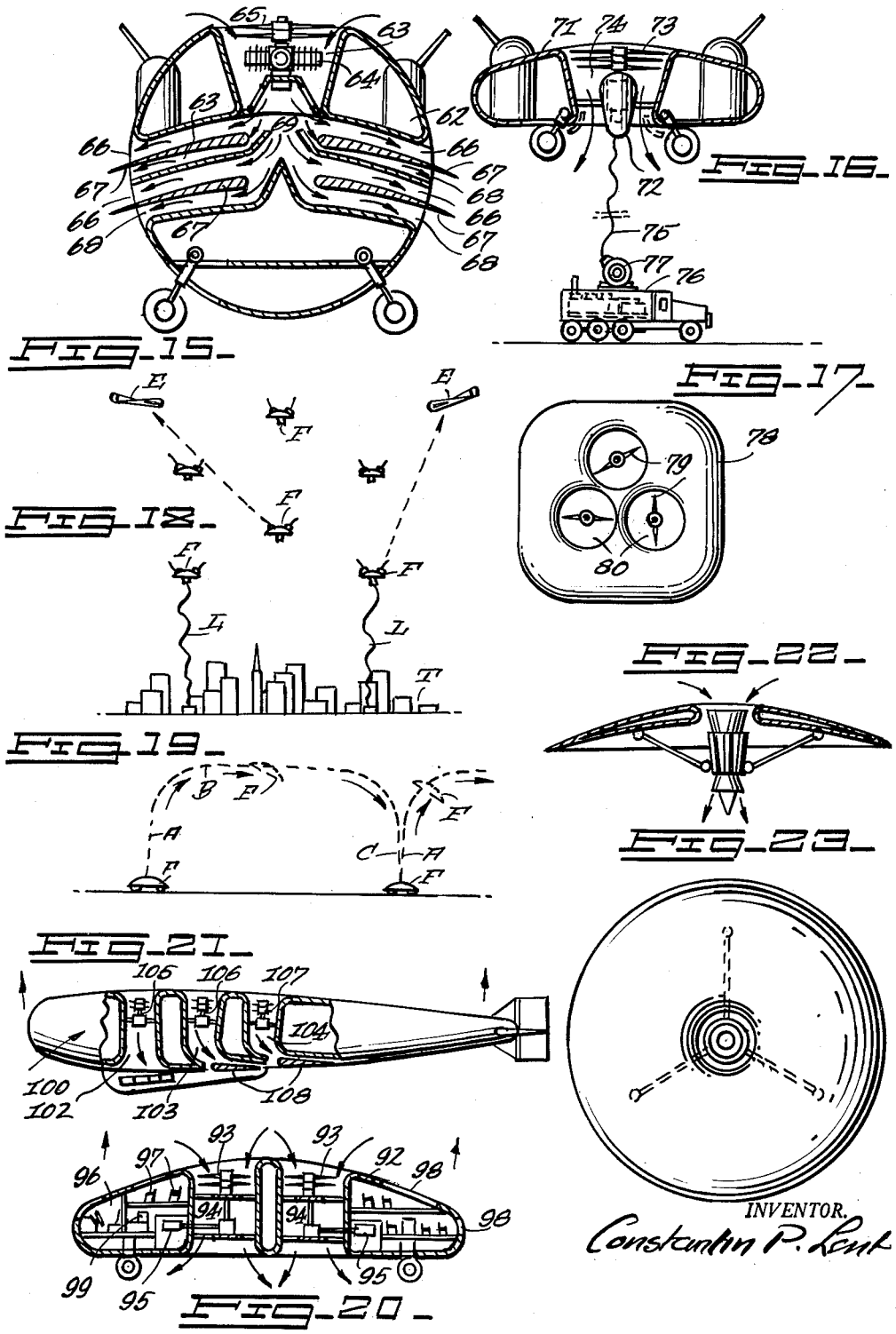

May 15, 1962

C. P. LENT 3,034,747

AIRCRAFT WITH DISCOID SUSTAINING AIRFOIL

Filed Jan. 8, 1957

INVENTOR
Constantin P Lent

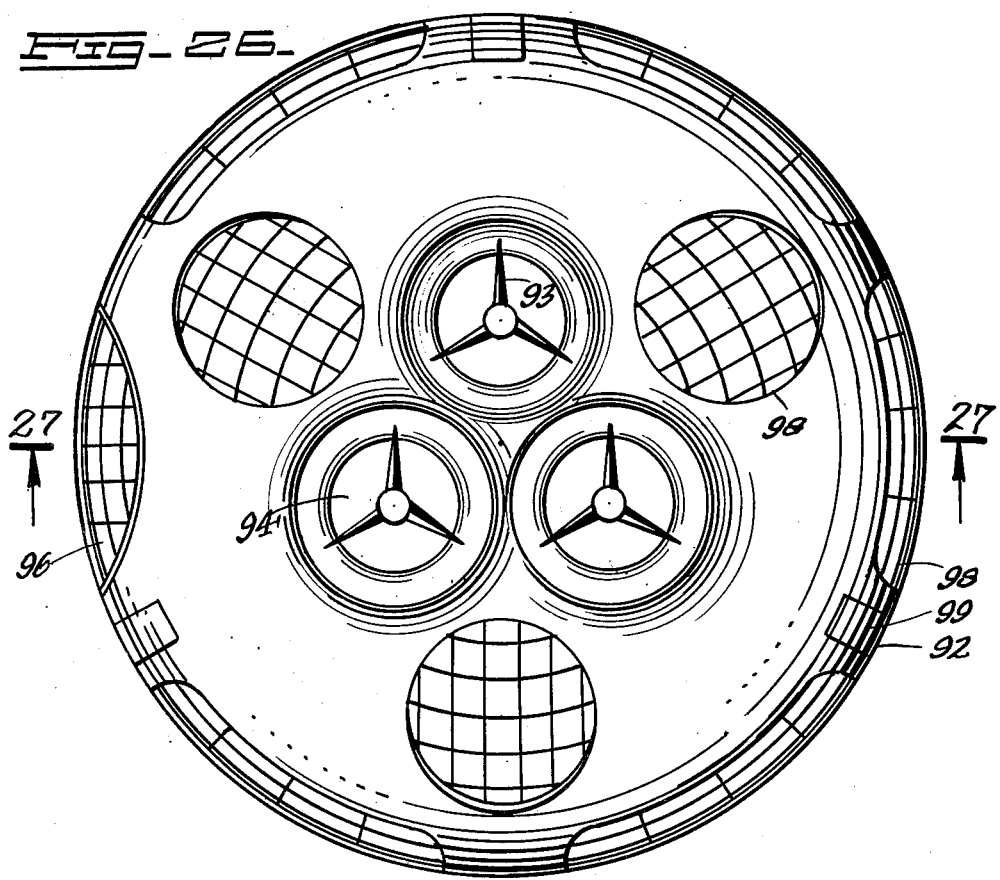
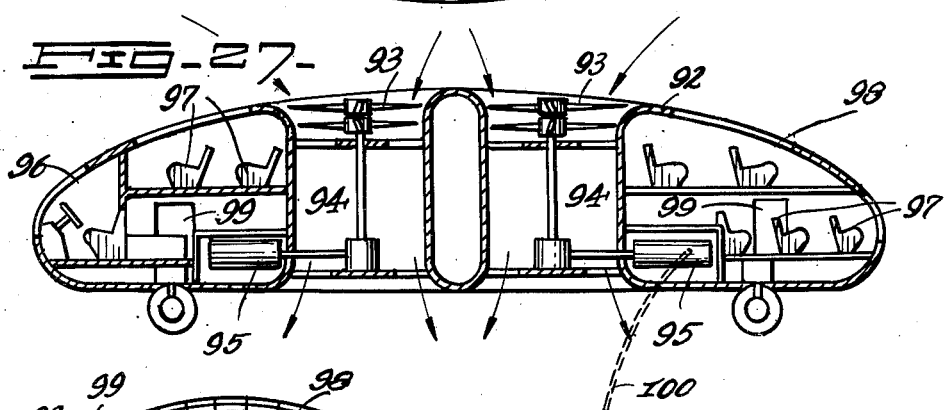
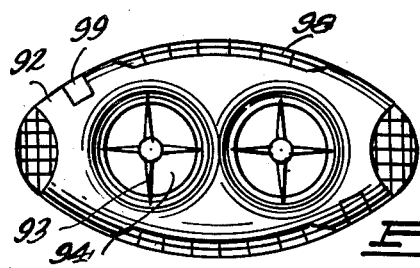

3,034,747
AIRCRAFT WITH DISCOID SUSTAINING AIRFOIL
Constantin P. Lent, 50 E. 42nd St., New York, N.Y.
Filed Jan. 8, 1957, Ser. No. 644,427
4 Claims. (Cl. 244—23)

This invention relates to saucer-shaped aircraft and more particularly to vehicles having a round or circular body contour known as flying saucers.

The flying saucer described in this invention is not a thing in the realm of phantasy but a very practical aircraft obeying approved aerodynamic principles. Its mode of operation permits it to remain indefinitely in the air and as long as its prime-mover is supplied with fuel. It can hover over the ground at any height from 5 to 50,000 feet and more. It can move transversely under the control of a navigator and crew. It can carry passengers.

The saucer-shaped aircraft described in this invention can find utilization in commercial transportation such as air travel, trans-continental and trans-oceanic passenger service, commuter transport, mail transport and delivery and bus service for cities and towns. it is extremely useful for private plane operation.

The flying saucer described in this invention can attain tremendous speeds and its maneuverability is enormous. It can rise vertically instantaneously and travel at supersonic speeds. But it can also fly at extremely low speeds and if necessary it can land and take-off vertically at a passenger elevator speed or even less.

The flying saucer is safe and easy to operate. In case of motor failure, it will safely land by means of its circular wing the latter serving as a landing parachute.

Heretofore, heavier than air craft such as airplanes and helicopters relied upon the aerodynamic action of straight or slanted wings to produce the desirable lift. In the helicopter the aerodynamic action of the rotor blades being rotated through the air produce the lift.

In an airplane, the fuselage of the craft including its wings is propelled through the medium of the atmospheric air by means of the forward pull of propellers which are driven by reciprocating engines. In jet planes, forward pull is produced by the reaction of the gases in jet motors. In rocket driven planes, forward motion is produced by the reaction of the gases in its rocket motors. The well known aerodynamic action of the airfoil of the wing of the plane as it streams through the air creates a vacuum space above the wing and an air pressure space below it. The sum total of both, vacuum and air pressure, producing the vertical lift component which permits the wing respectively the fuselage of the plane to leave the ground. This is the principle that makes an airplane fly.

In a helicopter, the oversized rotor blades have an airfoil cross-section similar to the wing of the plane. As the blades of the rotor are rotated through the air by means of its motor, a vacuum space is created above the blades and an air pressure below; the sum total of both producing a vertical lift. This is the principle that makes a helicopter hover above ground.

In the flying saucer craft described in this invention, the fuselage of the round-shaped body of the vehicle or circular wing is provided at the center portion thereof with air inlets or openings to permit a flow of air. The airflow in question passes from above the fuselage of the craft, under it. The flow of air is created by means of propellers or rotors driven by a prime-mover.

The action of the air passing through the air inlet in the vehicle is twofold. First, the sucking action of the propeller or rotor lifts the craft aloft and second, the flow of air thus created is directed against the airfoil cross-section of the circular wing to create a vacuum space over the wing and air pressure below it. The sum total of both, suction and aerodynamic action producing a lift.

Generally speaking this invention provides a circular structure which is equipped with one or a plurality of openings passing through said structure and being fitted with a motive means for creating an air stream and directing it from above said structure below it. The stream thus created creating a vacuum over the top surface of the circular structure and air pressure under said structure. The resultant sum of vacuum and pressure creating a vertical lift and permitting the circular wing to hover or move anywhere under the direction of a navigator.

One object of this invention is to provide a circular wing for aircraft provided with motive means to create a vertical lift.

Another object of this invention is to provide a circular wing aircraft and motive means to create a vertical lift.

Still another object of this invention is to provide a circular wing aircraft provided with one single centrally located opening said circular wing aircraft resembling a doughnut-shaped fuselage.

Still another object of this invention is to provide a round-shaped wing structure for aircraft provided with more than one opening such as two, three, four etc., located centrally in respect to the vertical axis of said round-shaped wing structure.

Still another object of this invention is to provide motive means within the centrally located opening or openings in said round-shaped wing fuselage.

Still another object of this invention is to provide propeller means within the centrally located opening or openings in said round-shaped wing fuselage.

Still another object of this invention is to provide a round-shaped wing fuselage provided with rotor means within centrally located opening or openings in said round-shaped wing fuselage.

Still another object of this invention is to provide a saucer-shaped aircraft which will have one, two, three, four or even more air intakes which will be located upon its outer surface leading into its fuselage. Said openings will contain propellers or air rotors to create a flow of air. The propellers and air rotors can be operated by means of reciprocating engines, electric motors, jets etc.

Another object of this invention is to provide an arrangement of wing structure and motive force to create a stream of air which being drawn from above said aircraft and its wing will be directed below it. This action producing a vertical lift.

Another object of this invention is to provide a doughnut-shaped craft having a circular wing of airfoil cross-section and means to pass a stream of air against said wing. The aerodynamic action of the air against said wing permitting the saucer doughnut-shaped craft not only to rise vertically but also to hover over the same position indefinitely or move saidways or in any other direction under the control of a navigator and crew.

Still another object of this invention is to create a flow of air and direct it against the inside edge of a circular airfoil differentiating from a straight airfoil. The action of the air blown against the inside edge of the circular wing creating a vacuum space over the wing and an air pressure space under it thus making it possible for said wing to take off vertically.

A further object of this invention is to provide a fuselage of a round-shaped wing contour which will contain an air inlet or hole in its center. The round-shaped wing being stationary in relation to a set of rotating propellers or air rotors. The propellers or rotors being located adjacent to said air inlet. The action of the propellers or rotors creating a stream of air through said inlet in the round-shaped wing.

Still another object of this invention is to provide double acting propeller means within the openings in said round-shaped wing fuselage.

Still another object of this invention is to provide a circular wing structure and reciprocating engine means or electric motor means to operate propellers or rotors contained within opening leading into said wing structure.

A still further object of this invention is to provide a round-shaped wing structure and air pump means located within openings leading through said round-shaped structure.

Still another object of this invention is to provide a round-shaped wing structure, holes passing through said structure, propeller or rotor means located within said holes. Said holes being equipped with baffle plates to direct a stream of air entering said holes from above through the holes in said wing structure.

Still another object of this invention is to provide a round-shaped wing structure resembling a doughnut, a single hole passing in the center portion of said structure, propeller or air rotor means inside said hole. Said hole being provided with baffle plates to direct a stream of air entering said holes against the wall portion comprising said holes in said wing structure.

Still another object of this invention is to provide a round-shaped wing structure comprising an airfoil with a single opening in its center, said wing structure resembling a doughnut-shaped wing, having a propeller or air motor means located within said opening. Said round-shaped wing provided also with a baffle plate within said circular opening for directing the air entering said opening from above against the internal edge of said airfoil.

A still further object of this invention is to provide a circular wing structure, said structure in cross-section being similar to the cross-section of standard airplane wings, or air foils.

A still further object of this invention is to provide a circular wing structure which has a number of openings running around its periphery, these openings provided with propeller or rotor means and motor means to operate said propeller or rotors.

A still further object of this invention is to provide a circular wing structure having one or more openings passing through said structure and cable means to supply electric current to electric motors located within said openings to operate rotors or propellers.

A still further object of this invention is to provide a spherical aircraft which is equipped with one, two or more concentric openings leading into said aircraft, said openings equipped with air rotors or propellers and motive means to operate said propellers to create a stream of air from above and direct it below.

A still further object of this invention is to provide a spherical aircraft provided with a central opening which contains an engine to operate propellers or air rotors to create a stream of air and to direct it against one or more circular wing-shaped airfoils.

A still further object of this invention is to provide a square or polygonal shaped wing fuselage which is equipped with one or more openings and propellers or air rotors in said openings.

A still further object of this invention is to provide a square shaped or polygonal wing fuselage which in cross-section is a standard airfoil wing, said fuselage being provided with one or more co-centric openings, propellers in said openings, and motive means to operate said propellers.

A still further object of this invention is to provide an ellipse-shaped wing structure containing one or two or more openings, propeller or air rotor means in said openings and motor means to operate said propellers or rotors.

A still further object of this invention is to provide a circular wing structure which has a number of openings running around the periphery, these openings provided with propeller or rotor means and motor means to operate said propellers.

A still further object of this invention is to provide a circular wing structure having one or more openings passing through said structure and cable means to supply electric current to electric motors located within said openings to operate rotors.

A still further object of this invention is to provide a spherical aircraft which is equipped with one, two or more co-centric openings leading into said craft, said openings equipped with air rotors or propellers and motive means to operate said propellers to create a stream of air from above and direct it below the wing structure of said aircraft.

A still further object of this invention is to provide a spherical aircraft equipped with a central opening which contains an engine to operate propellers or air rotors to create a stream of air and to direct it against one or two or more circular wing-shaped airfoils located in said aircraft.

A still further object of this invention is to provide a square or polygonal shaped wing fuselage which may be equipped with one or more openings and a set of propellers in said openings.

A still further object of this invention is to provide a square-shaped or polygonal wing fuselage which in cross-section resembles an airfoil. Said fuselage being provided with multiple co-centric openings, with propellers in said openings, and motive means to operate said propellers.

A still additional object of this invention is to provide an ellipse-shaped wing structure which may contain one or more openings, with propellers or rotor means in said openings and with motive means to operate said rotors or propellers.

Other objects will appear as the description of this specification will proceed.

Referring to figures:

FIG. 1 is a cross-section through a circular saucer-shaped wing fuselage showing the co-centric opening, propeller and reciprocating motor means to operate said propeller to create a stream of air from above and to direct it below said fuselage.

FIG. 2 is a cross-section through a circular doughnut-shaped wing structure showing co-centric opening, propeller means in said opening and reciprocating motor means to operate said propeller to create an air flow from below said structure and direct it against the inside edge of said doughnut-shaped wing structure.

FIG. 3 is a cross-section through a circular doughnut-shaped wing structure showing a co-centric opening and a reciprocating motor means operating an air rotor to create a flow of air from above said wing and to direct said air against the inside edge of the opening in the wing.

FIG. 4 is a cross-section through a circular saucer-shaped wing fuselage, motor means located within openings located in said wing and reciprocating engines to operate said rotors or propellers to create a flow of air from above said wing and to direct it below.

FIG. 5 is a plan view of the circular saucer-shaped wing fuselage on the line 5—5 of FIG. 1, showing one co-centric opening.

FIG. 6 is a plan view of the circular saucer-shaped wing fuselage taken on the line 6—6 of FIG. 4, showing more than one co-centric openings.

FIG. 7 is a cross-section through a circular wing, showing co-centric opening, propeller and reciprocating motor means and its application as an army transport vehicle.

FIG. 8 is a circular doughnut-shaped wing structure similar to the one shown in FIG. 7, equipped with an airfoil wing and reciprocating engine to operate a propeller to direct a flow of air against said airfoil.

FIG. 9 is a cross-section through a circular wing structure showing more than one co-centric openings which are equipped with propeller and reciprocating engines to create an air flow from above and direct it below said wing structure.

FIG. 10 is a craft similar to the one shown in FIG. 9, equipped with a number of openings located peripheral to the center of the wing. The openings are equipped with propellers and reciprocating engines to create a flow of air from above said structure and direct it below.

FIG. 11 is a plan view on the line 11—11 of FIG. 10.

FIG. 12 is a plan view taken on line 12—12 of FIG. 7.

FIG. 13 is a view taken on the line 13—13 of FIG. 9.

FIG. 14 is a view showing the application of the circular saucer-shaped wing in connection with standard airplane fuselages to create a vertical lift.

FIG. 15 is a cross-section through a spherical fuselage showing a co-centric opening and propeller and reciprocating engine means to create a flow of air from above and direct it against the inside airfoil edge of circular saucer-shaped wings within said spherical fuselage.

FIG. 16 is a cross-section through a circular wing showing the co-centric opening and a propeller means being operated by an electric motor to create a flow of air from above said structure. It also shows the electric cable means which provides electric current from the ground which is generated by a stationary generator or a portable generator station.

FIG. 17 shows a plan view of a square-shaped doughnut wing equipped with more than one co-centric openings through which a flow of air is directed from above the wing below it.

FIG. 18 shows the manner in which a city can be protected by means of doughnut-shaped flying saucers from enemy aerial attacks. The flying saucers hovering, like flying forts, above the objective to shoot down the enemy aircraft.

FIG. 19 is a view showing the manner the flying saucer is launched vertically, how it hovers above ground and travels parallel to the ground and how it lands straight down. It is made to hop and hover from one place to another.

FIG. 20 is a cross-section through a flying saucer bus showing the arrangement of parts, the location of the passenger seats, the navigator's cabin and the propellers within the air inlets. Also the manner of operation.

FIG. 21 is a cross-section through a lighter than air craft, showing the manner in which the propellers or air rotors are contained within the air inlet channels and the application of airfoil surfaces to produce a vertical lift and transverse motion.

FIG. 22 is a section through the airfoil wing showing the application of a jet engine for the purpose of creating an air stream. The air stream created by the suction of the jet engine intake is diverted by means of baffle plates against the airfoil to create vertical lift.

FIG. 23 is an elevational view of FIG. 22, showing the circular wing with the jet engine to produce an air stream.

FIG. 26 is a plan elevational view of a bus similar to the one shown in FIGS. 24 and 25, with its fuselage being provided with more than one air duct. The bus in this case has a fuselage with three vertical ducts.

FIG. 27 is a section on the line 27—27 taken through the bus in FIG. 26, showing the seating arrangement, the driver's seat, instruments and the air ducts passing through the fuselage.

FIG. 28 is a plan elevational view of a bus similar to the one shown in FIGS. 24 to 27 inclusive. In this case the fuselage is somewhat elongated, rather an ellipsoid, instead of circular.

*Specifications*

Figure 24:
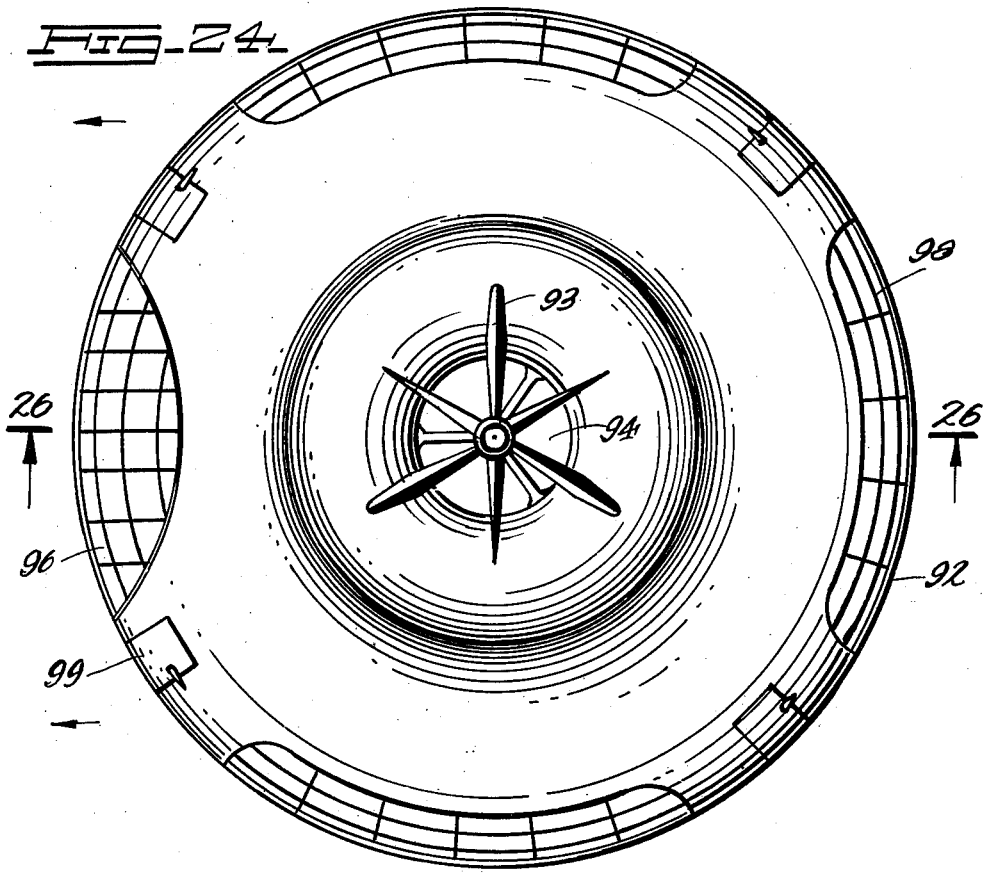
FIG. 24 is an elevational view of the air bus having a circular fuselage showing the air duct, the prime-mover and propeller means, and the arrangement of doors and windows around its circumference.
Figure 25:
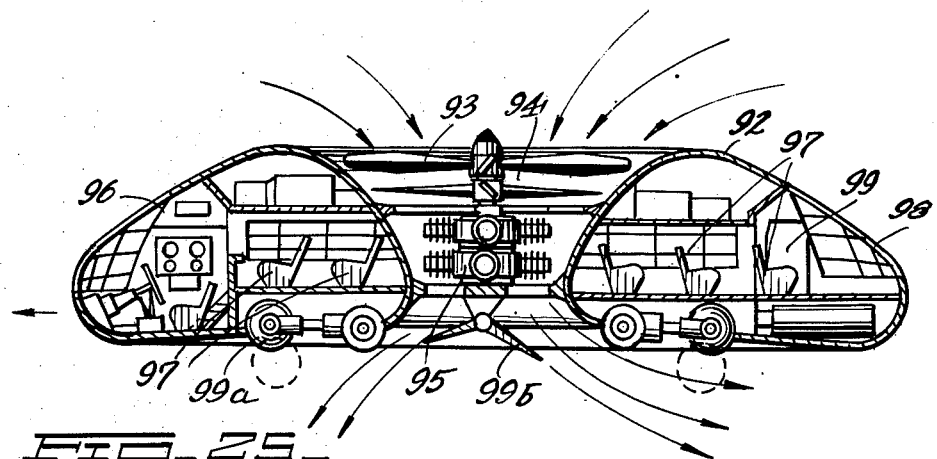
FIG. 25 is a section on the line 25—25 of FIG. 24, showing the air bus' interior with its seating capacity, the driver's seat, the driving instruments, and the duct passing through the fuselage.

Referring more particularly to FIG. 1, numeral 30 indicates the fuselage of the saucer-shaped circular wing which consists of an outside peripheral rim 31 and an inside circular opening 32. The opening or hole 32 in the circular fuselage 30 gives the wing a doughnut-shaped contour.

Preferably, in cross-section, the circular wing resembles a standard airfoil, although it may possess any other cross-section such as circular, elliptical, parabolic, hyperbolic or rectangular.

A cabin-shaped structure 33 is suspended under the circular wing 30 and is secured to the latter preferably by means of cables 34, or in some other manner. The cabin 33 might also be contained within the structure of the wing proper. A prime mover comprising a reciprocating engine 35 is suspended inside the circular opening 32 in the wing 30. Propeller means 36, comprising one or two propellers or an air rotor, is geared to the reciprocating engine 35 to be operated by the latter.

The propeller means 36 operated by the engine 35 creates a flow of air through the opening 32. The air being drawn from the top over the wing, by the action of the rotating propeller blades, passes through the circular opening 32 and is directed below and under the wing 30.

In FIG. 2, which shows a saucer-shaped wing similar in construction to the one shown in FIG. 1, a circular baffle disk 37 is contained within the circular opening 32 in the doughnut-shaped wing 30. This arrangement is preferable when the propeller means 36 is rotated in such a manner as to create a flow of air from under circular wing directing it against the baffle disk 37. Some of the air thus directed will pass through the space 38 formed by the inside edge 32x of the opening 32 in the wing 30 and some will be blown directly under the circular wing proper.

Referring to FIG. 3, an air rotor 39 is utilized to create a flow of air from above the wing 30. Preferably the rotor 39 is placed above the opening 32. The opening 32 is also provided with a pair of circular baffle disks 40 and 41. The reciprocating means 35 which rotates the air rotor 39 creates a flow of air directing it through the spaces 42 and 43 which are formed by the inside edge 32x in the opening 32 of the wing 30, the baffle disk above the wing and the baffle disk below it.

Referring more particularly to FIG. 4, it illustrates the application of the same principle of air flow as shown in FIGS. 1–3 inclusive having a wing 30x similar in construction to the one shown in said figures but being also equipped with a plurality of openings 32x instead of one. Propeller means 36x which are located in the immediate proximity of the openings 32x, or inside said openings, are being operated by reciprocating engine means. Said means creating a flow of air from above the wing 30x, and through the openings 32x directing the air under the wing proper.

FIGS. 5 and 6 respectively show views taken on the line 5—5 of FIG. 1, and 6—6 of FIG. 4.

FIGS. 7 to 13 inclusive, show the application of the flying saucer principle to transport vehicles, for commercial or military use such as air buses, army transport, fortifications etc.

In FIG. 7, numeral 49 is the fuselage of the vehicle preferably of circular contour. A reciprocating motor means 46 is located in a centrally located opening 45; the motor means 46 operating a set of counter-driven propellers 47. The vehicle is also equipped with a landing gear 48 which includes a set of inflated rubber tires or the like. The vehicle shown in FIG. 7 can be used for passenger service or troop transport. It can be equipped with gun turrets 49 and other defense weapons.

In the vehicle shown in FIG. 8, it is very similar in construction to the one shown in FIG. 7, differentiating only in the fact that an extra doughnut-shaped wing 50 is added to it. The wing 50 is located in the lower portion of the vehicle 44. A baffle disk 51 is utilized to direct the air through the space 52, above the wing 50 and through the space 53 below the wing 50.

Referring to FIG. 9, it shows the application of a plurality of prime movers 46x in connection with more than one openings 45x through which air is sucked by the action of propeller means 47x in the openings 45x. Propeller means 47x are operated by the prime mover means 46x.

FIG. 10 shows the application of the flying saucer principle in connection with a plurality of prime mover means which are placed upon the outside circumference or periphery of the vehicle. In this particular case the openings 45xx are located peripherally the cabin 54. The prime mover means 46xx drive propeller or rotor means 47xx which are set within the openings 45xx in the vehicle.

FIG. 11 is a plan view of FIG. 10, showing the manner in which the multipowered units 46xx are arranged upon the vehicle 44xx.

FIGS. 12 and 13 are plan views taken on the lines 12—12 of FIG. 7 and 13—13 of FIG. 9 respectively.

FIG. 14 shows the application of the flying saucer principle in connection with standard airplane fuselages. In this particular case the doughnut-shaped wing is secured to the plane 57 by a connecting structure 56. The prime mover which is driving the air rotor 58 creates a flow of air from above the wing 55 directing it below same to produce a vertical lift. Jet motors or propeller means 60 are used to provide forward motion.

Referring more particularly to FIG. 15, the vehicle 61 is of a spherical contour and includes a spherical fuselage 62 which has one, two, three, four or more openings 63. A prime mover 64 is located within the opening 63 to operate a pair of counter-moving propeller means 65. The stream of air created by the propeller means 65 is directed through the space 66 above the saucer-shaped wings 67 and below said wings through the space 68. The baffle disks 69 and 70 serve to direct the air.

FIG. 16 shows a vehicle 71, similar in construction to the one shown in FIGS. 1 to 15 inclusive, in this particular case the propeller means 73 is being operated by means of an electric motor 72 instead of a reciprocating engine means. The electric motor 72 drives the propeller means 73 which is located within the openings 74. A flexible electric cable means 75 leads from the electric motor 72 to a portable or stationary generating station 76. The electric current generated by the generating station 76 is delivered to the vehicle 71 by means of the cable means 75 which is wound around cable-reel 77.

In FIG. 17 is shown a vehicle 78 similar in construction to the one shown in FIGS. 1 to 16 inclusive, preferably of rectangular contour. The wing 78 is equipped with propeller means 79 which are located within the opening 80 and are operated by prime mover means (not shown).

FIG. 18 is showing the manner in which the flying saucer shown in FIGS. 1 to 17 inclusive can be operated in warfare for defense purposes to protect a city from enemy attacks. Some flying saucers F shown in FIG. 18 are operated by means of reciprocating engines while others by means of electric motors which are fed electric current through the medium of the flexible cables L. The attacking enemy planes are designated as E.

FIG. 19 shows the manner in which the flying saucer can be utilized as a transport vehicle and the manner in which it can move or hop from place to place. Upon landing the vehicle F goes straight up as shown at A. It is flying across the country as it is shown at B and it lands, straight down as it is shown at C.

FIG. 20 shows the application of the flying saucer principle to air buses. Numeral 92 designates the fuselage of the air bus, 93 the propellers which are driven by motors 95. The air is sucked by the propellers 93 through the vertical inlets 94. The passenger seats 97 are located around the circumference of the vehicle and the driver's cabin 96 faces forward. The windows 98 permit outside vision while door opening 97 permits the loading of the craft.

Referring to FIG. 21, it is showing the application of the flying saucer principle to lighter than air craft. Numeral 100 designates the body of the craft which supports cabin 101 under its fuselage. The craft 100 is equipped with a number of canals 102, 103 and 104 which are vertically located within its fuselage. Propeller and motor units 105, 106 and 107 serve to create a stream of air from above the craft and direct it under its belly. In the case of the canal 102, the air is directed towards the lower portion of its fuselage while in the case of the canals 103 and 104 the air flow is directed against the airfoil wings 108, located under the belly of the craft 100 to create a vertical lift which is independent from the lift created by the craft's gas tanks.

The stream of air thus produced by the propeller and motor units 106 and 107 also produces a horizontal force which drives the lighter than air craft forward in addition to the lift created by said wings because of their airfoil cross-section.

The application of the saucer principle herein described to lighter than air craft will dispense with the need for large gas tanks to lift the vehicle and permit the use of smaller fuselage and create a greater lift.

What I claim is:

1. An air bus comprising a circular fuselage having an entry and an exit door and windows around its outer circumference, a driver's seat and navigational instruments mounted in said fuselage; said vehicle having a centrally located vertical duct passing through said fuselage, a vertical shaft mounted in the duct, a prime mover engine means in said duct to operate said shaft, propeller means fastened to said shaft to rotate when said prime mover operates said shaft, said duct having an opening, baffle plates mounted in said duct opening to divert the flow of air created by the operation of said propeller to fly said vehicle, and shock absorbing means mounted on said fuselage to facilitate safe launching and landing in said air bus.

2. A vehicle comprising a circular fuselage having an entry and an exit door and windows around its outer circumference, a driver's seat and navigational instruments mounted in said fuselage, said vehicle having more than one vertical duct passing through said fuselage, a vertical shaft mounted in each duct, a prime-mover engine means in each duct to operate each shaft, propeller means fastened to each shaft to rotate when each prime-mover operates its respective shaft, each duct having an opening, baffle plates mounted in said duct openings to divert the flow of air created by the operation of said propellers to fly said vehicle, and shock absorbing means mounted on said fuselage to facilitate safe launching and landing of said vehicle.

3. A vehicle comprising a circular fuselage having an entry and an exit door and windows around its outer circumference, a driver's seat and navigational instruments mounted in said fuselage, said vehicle having a centrally located vertical duct passing through said fuselage, a vertical shaft mounted in the duct, a prime-mover engine means in said duct, said prime-mover comprising an electric motor, propeller means fastened to said shaft to rotate when said electric motor operates said shaft, said duct having an opening, baffle plates mounted in said duct opening to divert the flow of air created by the operation of said propeller to fly said vehicle, shock absorbing means mounted on said fuselage to facilitate safe launching and landing of said vehicle, and an electric cable leading from said motor in said vehicle to a power generating means on the ground, said cable trailing from said vehicle when said vehicle takes off.

4. An air vehicle comprising an elliptically-shaped fuselage having an exit and an entry door and windows around its outer contour, a driver's seat and navigational instruments mounted in said fuselage, said vehicle having more than one vertical duct passing through said fuselage, a vertical shaft mounted in each duct, a prime-mover engine means in each duct to operate each shaft, propeller means fastened to each shaft to rotate when said prime-movers operate said shafts, each duct having an opening, baffle plates mounted in said duct openings to divert the flow of air created by the operation of said propellers to fly said vehicle, and shock absorbing means mounted on said fuselage to facilitate safe launching and landing.

References Cited in the file of this patent

UNITED STATES PATENTS

| | | |
|---|---|---|
| 1,846,125 | La Fon | Feb. 23, 1932 |
| 1,911,041 | Smyser | May 23, 1933 |
| 2,008,464 | Nishi | July 16, 1935 |
| 2,399,218 | Felberg | Apr. 30, 1946 |
| 2,468,787 | Sharpe | May 3, 1949 |
| 2,547,266 | Hoglin | Apr. 3, 1951 |
| 2,726,829 | Hillis | Dec. 13, 1955 |
| 2,730,311 | Doak | Jan. 10, 1956 |
| 2,876,964 | Streib | Mar. 10, 1959 |

FOREIGN PATENTS

| | | |
|---|---|---|
| 16,153 | Great Britain | of 1908 |
| 129,142 | Great Britain | July 10, 1919 |
| 691,627 | France | July 15, 1930 |
| 406,971 | Great Britain | May 30, 1932 |
| 1,138,029 | France | Jan. 21, 1957 |